3,396,176
PARADIOXADIENE-$N_2F_4$ ADDUCTS HAVING ONE $NF_2$ GROUP ATTACHED TO EACH OF TWO OR FOUR CARBON ATOMS IN THE DIOXADIENE RING

Ralph J. Leary and Perry A. Argabright, Cranford, and James R. Michael, Roselle, N.J., assignors to Esso Research and Engineering Company, a corporation of Delaware
No Drawing. Filed Dec. 21, 1960, Ser. No. 77,469
4 Claims. (Cl. 260—340.6)

This invention relates to new compounds which are formed by reacting tertafluorohydrazine, $N_2F_4$, with heterocyclic diene having oxygen atoms in its 6-member ring. More particularly, it is concerned with reacting $IV_2F_4$ with a heterocyclic diene designated by the name dioxadiene (or p-dioxadiene), which is represented by the following formula:

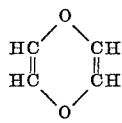

In accordance with the present invention, novel compounds of interest as oxidizer and binder components for rocket fuels are synthesized by a reaction of dioxadiene with $N_2F_4$, especially if the reaction is carried out under the presently disclosed conditions. The monoadduct is prepared by addition of one mole of $N_2F_4$ to one mole of dioxadiene. This monoadduct material has one $NF_2$ group for each two carbon atoms in the ring but retains the one reactive double bond in the ring. By increasing the severity of reaction conditions, it has been found possible to add a second mole of $N_2F_4$ to the heterocyclic diene and thereby obtain a high density compound having one $NF_2$ group per C atom.

The ability of the dioxadiene to be saturated with $NF_2$ groups is surprising because earlier work had shown that there was difficulty in saturating the double bonds of cyclic diolefins without forming degradation products through the splitting out of $HNF_2$ and through the formation of polyenes which would contain relatively few of the high energy $NF_2$ groups. Experimental details on the method for preparation of the monoadduct and of the diadduct will appear in the following examples:

EXAMPLE 1.—MONOADDUCT PREPARATION

Into an evacuated glass bulb reactor, with an attached monometer, are charged the dioxadiene and $N_2F_4$. The amount of $N_2F_4$ can be stoichiometric or in excess. In all runs the pressure has been subatmospheric.

The mixture of reactants is heated at 60–100° C. for 2–3 hours and the progress of the reaction is followed by the decrease in pressure.

After completion of the reaction, the excess $N_2F_4$, if employed, is removed by cooling the reaction mixture to −78° C. and distilling the $N_2F_4$ into an evacuated trap cooled in liquid nitrogen.

The monoadduct of dioxadiene is then pumped through and collected in a trap cooled in Dry Ice.

Analysis of dioxadiene monoadduct.
Found: F, 38.8, 40.4%; N, 14.85, 14.87%. Calc'd for $C_4H_4O_2N_2F_4$: F, 40.4%; N, 14.9%.

There is no indication of diadduct formation.

The dioxadiene monoadduct can be used as a monomer for addition polymerization or as an intermediate for the preparation of $NF_2$-containing difunctional compounds which can serve as monomers for condensation or addition polymerizations.

EXAMPLE 2.—DIADDUCT PREPARATION

Dioxadiene and $N_2F_4$ are charged into an evacuated glass bulb reactor which has an attached monometer. Although it is preferable to carry out the reaction with an excess of $N_2F_4$, a stiochiometric amount of 2 moles $N_2F_4$ per mol of dioxadiene may be employed. All runs have been made at subatmospheric pressure.

The mixture of reactants are heated at 100° C. for 1–2 hours and then at 150–160° C. for 20–24 hours. Although all the reactions have been carried out in this stepwise fashion, there is no known reason why the reaction could not be heated directly to 150–160° C.

After the reaction is complete, the excess $N_2F_4$, if employed, is removed by cooling the reaction mixture to −78° C. and distilling the $N_2F_4$ into an evacuated trap cooled in liquid nitrogen.

The dioxadiene diadduct is then pumped through and collected in a trap cooled in Dry Ice.

Analysis of the diadduct:
Found: F, 51.5%; N, 18.9%. Calc'd for $C_4H_4O_2N_4F_8$: F, 52.0%; N, 19.2%. $d_4^{20}=1.668$ (density in gram per cc.). $n_D^{20}=1.3758$ (refractive index).

Gas chromatography of the dioxadiene diadduct showed the product contained four of the five possible stereoisomers.

The preparation of the diadduct has a number of advantages in its preparation, properties and uses as compared to the monoadduct and other types of $NF_2$ containing compounds.

The diadduct, having one $NF_2$ group attached to each carbon in the heterocyclic ring, has the highest density of any $NF_2$ containing compound that has been prepared thus far. The high density is an important factor in rocket propellant formulations.

The diadduct prepared as illustrated in Example 2 was made in standard glass equipment. This eliminates the need for high pressure finger bombs as reactors.

The preparation of the diadduct is very clean with little or no tar formation.

The diadduct can be cleaved and polymerized to form a high molecular weight linear polyether with a high $NF_2$ content for use in solid propellant systems. The diadduct can be used as an intermediate in the preparation of other $NF_2$-containing compounds.

The stereoisomers of the diadduct can be separated to give rise to solid oxidizers which have melting points above 30° C.

The isomers of the diadduct may be separated and be used according to the degree of impact sensitivity of the individual isomers.

What is claimed is:

1. A compound selected from the group consisting of (I) $C_4H_4O_2N_2F_4$ and (II) $C_4H_4O_2N_4F_8$, the compound of Formula I having one $NF_2$ group attached to each of two carbon atoms in the ring nucleus of p-dioxadiene which retains one reactive double bond, and the compound of Formula II having one $NF_2$ group attached to each of four carbon atoms in the ring nucleus of p-dioxadiene with its double bonds thus saturated.

2. The normally solid compound having the empirical formula $C_4H_4O_2N_4F_8$, having one $NF_2$ group being attached to each of the carbon atoms in the ring nucleus of p-dioxadiene with its double bonds thus saturated, and having a melting point above 30° C.

3. A process of preparing a compound having the empirical formula $C_4H_4O_2N_2F_4$ which consists of reacting p-dioxadiene with an equimolar proportion of $N_2F_4$ at 60° C. to 100° C. for 2 to 3 hours under subatmospheric pressure, and recovering the resulting product.

4. A process of preparing a compound having the empirical formula $C_4H_4O_2N_4F_8$ which consists of reacting p-dioxadiene with 2 moles of $N_2F_4$ at 150° C. to 160° C. under subatmospheric pressure for 20 to 24 hours, removing any excess $N_2F_4$ and recovering the resulting product.

References Cited

UNITED STATES PATENTS 3,215,79  11/1965  Logothetis _____ 260—349

OTHER REFERENCES

Hoffman et al.: "Chemical Reviews," vol. 62, pp. 12–18 (1962).

NICHOLAS S. RIZZO, *Primary Examiner.*

J. H. TURNIPSEED, *Assistant Examiner.*